3,591,678
Patented July 6, 1971

3,591,678
METHOD OF PURIFYING INTRINSIC FACTOR
Leon Ellenbogen, New City, N.Y., and Derek Rowland Highley, Upper Saddle River, N.J., assignors to American Cyanamid Company, Stamford, Conn.
No Drawing. Continuation-in-part of application Ser. No. 615,355, Feb. 13, 1967, which is a continuation-in-part of application Ser. No. 340,805, Jan. 28, 1964. This application Sept. 5, 1969, Ser. No. 855,768
Int. Cl. A61k 27/00
U.S. Cl. 424—96                        4 Claims

ABSTRACT OF THE DISCLOSURE

A process for purifying intrinsic factor by a batch chromatography process which utilizes an ion exchange resin; and the resultant high purity intrinsic factor. Typically, impure intrinsic factor is dissolved in a buffer solution having relatively low pH and ionic strength, and the resultant solution is contacted with a cellulosic exchange resin. The resin is separated from the solution and the purified intrinsic factor is eluted therefrom with a buffer solution having a higher pH and ionic strength than the buffer solution in which the impure intrinsic factor was dissolved. The product is recovered from the eluate by evaporating the liquid solvent. The residue, which is the purified product, has a potency of at least 1 N.F. unit in amounts as low as 0.5 mg.

---

This application is a continuation-in-part of application Ser. No. 615,355, filed Feb. 13, 1967, now abandoned which in turn is a continuation-in-part of application Ser. No. 340,805, filed Jan. 28, 1964, now abandoned.

Generally stated, the subject matter of the present invention relates to a process of purifying intrinsic factor. More particularly, the invention relates to a batch chromatography process employing a cellulose ion exchange resin.

Progress in the isolation of intrinsic factor has been hampered in the past by a lack of relatively large quantities of high purity material for use in further fractionation. Several workers have subjected crude intrinsic factor to conventional ion exchange column chromatography such as Heatley et al., Biochem. J. 76,342 (1960), and Robbins, K. C., U.S. Pat. No. 3,008,877. The disadvantages of this technique are first, a limitation of sample size, and second, a substantial dilution of the intrinsic factor. Recently, a process has been described by Holdsworth, E. S., Biochem., Biophys., ACTA 51, 295 (1961), in which the batch technique is employed to purify crude commercial intrinsic factor, and thus avoid the problem of dilution that followed column chromatographic separation. However, several fractionation steps are necessary to obtain intrinsic factor in sufficiently pure form.

It is an object of this invention to provide a process which is capable of giving intrinsic factor in a pure and concentrated form. It is a further object of this invention to provide a process for separating intrinsic factor while avoiding the difficulties of prior processes. Other objects will be apparent from the ensuing description of this invention.

In accordance with this invention, a batch chromatography process is used to purify intrinsic factor. The process comprises dissolving impure intrinsic factor in a buffer solution having a pH of from about 5.9 to 6.3 and a molarity of from about 0.010 to 0.020, contacting the solution with an ion exchnge resin, separating the resin and eluting the ion exchange resin with a buffer solution having a pH of from about 7.4 to 7.8 and a molarity of from about 0.070 to 0.080, and recovering intrinsic factor from the eluate.

The process of this invention obviates many of the inherent disadvantages of the processes heretofore available for purifying intrinsic factor. Thus, the product obtained by the process does not need additional purification thereby substantially reducing the time needed for processing. Since batch processing avoids the necessity of monitoring the eluant, special monitoring equipment is not required for the practice of this invention. Furthermore, relatively large amounts of impure intrinsic factor can be purified by this process to obtain a product of tenfold purification while obtaining approximately 100% yield. By employing the process of the present invention, as much as 25 to 40 g. of starting material has been processed to yield 2.5 to 4 g. of purified intrinsic factor.

The cellulosic resin is added to the impure intrinsic factor, dissolved in a sufficient amount of buffer solution having the required pH molarity. The amount of cellulosic resin may be from about 1 gram to about 2 grams per gram of intrinsic factor concentrate. The best results are obtained with approximately 1 gram of cellulosic resin per gram of intrinsic factor concentrate of 5 mg. potency.

The suspension or slurry of adsorbent in the buffered solution of impure intrinsic factor is agitated at a temperature of from about $0°$ C. to about $37°$ C., preferably at about $4°–10°$ C., for a period of about 0.5 to 5.0 hours. However, one hour is usually sufficient for complete adsorption to be effected. At the end of this time, the adsorbent is removed by filtration or centrifugation and, if desired, washed with more of the same buffer solution.

Substantially pure intrinsic factor is removed from the adsorbent by contacting the adsorbent with a buffer solution having a pH of about 7.4–7.8 and a molarity of about 0.070–0.080. The volume of buffer solution employed to effect elution of the adsorbed intrinsic factor may be from about 10 ml. to approximately 50 ml. per gram of adsorbent. The best results are obtained when approximately 40 ml. of buffer solution is employed per gram of adsorbent. The suspension is agitated at a temperature of from about $0°$ C. to $37°$ C., preferably $4°$ C., for only a short period of time, since elution of the intrinsic factor from the adsorbent takes place rather quickly.

The spent adsorbent is then removed by any conventional means such as filtration or centrifugation, and substantially pure intrinsic factor is recovered from the eluate by freezing and lyophilizing the eluate. The resulting product has approximately ten times the activity of the impure intrinsic factor employed as the starting material. Lastly, the intrinsic factor may be desalted by any conventional means such as ultrafiltration, dialysis, or by the use of ion exchange resins.

The intrinsic factor obtained by the process of this invention has a much higher purity than intrinsic factor obtained from presently available processes which employ only one recovery step to isolate intrinsic factor from solution. The processes now employed require a large number of fractionation steps to obtain intrinsic factor concentrates. These processes are time-consuming and expensive and are therefore undesirable.

The intrinsic factor obtained by the process of the present invention, when assayed by the Schilling assay procedure, demonstrates that approximately 0.5 mg. of the purified material has 1 N.F. unit of intrinsic factor activity. Furthermore, relying both on the assay and the amount of freeze dried material obtained, there is substantially complete recovery of all of the intrinsic factor activity. The intrinsic factor obtained by the process of this invention is extremely pure and it can be used in certain applications in which intrinsic factor obtained by prior processes was not useful.

Thus, since the intrinsic factor obtained by the process of this invention is extremely pure, it can be employed as a biochemical tool for in vitro studies where intrinsic factor obtained by prior processes was unsuitable. Thus, the pure intrinsic factor obtained by the process of this invention can be used to determine the role of cobamide coenzymes in a wide variety of metabolic reactions. In addition, the product of this invention is useful for in vitro nonmicrobiological techniques to assay vitamin $B_{12}$ from various sources. The in vitro studies in which the products of this invention are useful are described by Ellenbogen and Highly, Vitamin and Hormones, vol. 21, pp. 1–49 (1963), especially pp. 32–35 and the articles cited therein.

The highly purified intrinsic factor of this invention which is obtained from hogs is stable in dry form for more than three years and in solution for at least one year when stored at 10° C., and for more than 24 hours when stored at 37° C. It binds 6.0 µg., of vitamin $B_{12}$ or the various coenzyme forms of the vitamins, per milligram of intrinsic factor. No appreciable dissociation of complexes comprising vitamin $B_{12}$ and the hog intrinsic factor is caused by exhaustive dialysis at 10° C. for as long as 72 hours. In the presence of an equal amount of unbound vitamin $B_{12}$ at 37° C., the bound vitamin undergoies only negligible exchange. This finding is in contrast to observation with crude human or rat intrinsic factor preparation as reported by Donaldson and Katz, J. Clin. Invest., vol. 42, pp. 534 (1963).

The salts used to prepare the buffer solutions employed in the novel process of the present invention need only meet the criteria of compatibility with both intrinsic factor and the ion exchange resin. Illustrative of salts which may be used are acetate, borate, carbonate, and phosphate salts among others. The cation of the salt employed in the buffer solutions can be sodium, potassium or ammonium. Typical buffer solutions of appropriate buffering range are those prepared from sodium borate, potassium phosphate, ammonium carbonate, sodium dihydrogen phosphate and the like.

The cellulose ion exchange resins employed in the novel process of the present invention are known and described in the literature. See Peterson and Sober, J.A.C.S 78:751, 1956. In the following examples diethylaminoethyl cellulose is employed, however, for the purpose of this invention, cellulose ion exchange resins in general, may be employed including for example triethylaminoethyl cellulose and the like.

The impure intrinsic factor employed in the novel process of the present invention is generally derived from pyloric mucosa of hog stomachs. However, impure intrinsic factor obtained by various processes of the prior art may also be used in addition to a meat-slurry extract, for example, the impure intrinsic factor obtained by the cold water extraction process set forth in U.S. Pat. No. 3,051,608 to Ellenbogen et al., or the impure intrinsic factor obtained by the proteolytic enzyme digestion process set forth in U.S. Pat. No. 3,020,204 to Ellenbogen et al. In addition, the impure intrinsic factor obtained by the ammonium sulfate precipitation process disclosed in U.S. Pat. No. 2,848,367 to Williams et al., may also be employed. The impure intrinsic factor which can be purified in the process of the present invention, can have a wide range of potencies. For example, impure intrinsic factor with a potency of 1 N.F. unit per 5 to 300 mg. in the Schilling urinary assay can be purified and the resultant product will be more potent than the starting material.

The following examples are provided for illustrative purposes. The examples should not be construed as limiting the invention, many variations of which are possible without departing from the spirit or scope thereof.

EXAMPLE 1

Preparation of purified intrinsic factor

This example demonstrates a process for preparing purified intrinsic factor active at 0.5 to 1 mg.

Between 10 to 40 g. of ammonium sulfate fraction, prepared with hog duodenum by the process disclosed in Example 3 of U.S. Pat. No. 2,848,367, Williams et al., is dissolved in a 0.015 M phosphate buffer solution, having a pH of 6.1. The solution is then incubated with approximately 50 grams of diethyl aminoethyl cellulose for 1 hour at 4° C. with gentle stirring (volume 2.5 liters). The suspension is then filtered through a coarse sintered glass funnel and the filtrate, containing approximately 80% of the original protein is discarded. The diethylaminoethyl cellulose cake is resuspended in 1 liter of the same buffer solution, and poured into a small sintered glass funnel of such dimension that the height of the compressed diethylaminoethyl cellulose cake is about equal to its diameter; the filtrate is discarded. A 0.075 M phosphate eluting buffer solution, having a pH of 7.6, is allowed to flow slowly through the diethylaminoethyl cellulose cake and 50 ml. aliquots of the effluent are collected. Intrisinc factor activity is restricted to approximately 100 ml. of the effluent. The presence of intrinsic factor can be detected by the appearance of a brown color in the effluent, thereby enabling a change in receiver at the proper time. In this manner 5 to 10% of the original protein was recovered with almost quantitative yield of intrinsic factor activity.

The binding capacity of the intrinsic factor purified by the batch chromatography process of the present invention without subsequent fractionation or isolation of intrinsic factor is about 6 µg., $B_{12}$/mg., and it is active clinically at 0.5 mg. A five to ten-fold purification thereby results which constitutes approximately 100% recovery of activity.

EXAMPLE 2

Preparation of purified intrinsic factor

This example demonstraetes the preparation of purified intrinsic factor from a meat-slurry extract obtained from hog pyloric mucosa.

Approximately 500 ml. of a meat-slurry extract obtained from hog pyloric mucosa prepared by the method disclosed in U.S. Pat. Nos. 3,051,608 and 3,020,204, Ellenbogen et al., is treated in the same manner as set forth in Example 1.

A material active at 0.5 mg. [i.e., 0.5 mg. has a potency of 1 N.F. unit, in the Schilling urinary excretion test as modified by Ellenbogen et al., Blood, 13,582 (1958)] is obtained. This represents a ten-fold purification.

Although the invention has been described and illustrated by reference to particular embodiments thereof, it will be understood that in its broadest aspects the invention is not limited to such embodiments, and that variations and substitution of such equivalents may be resorted to within the scope of the appended claims.

What is claimed is:

1. A batch chromatography process for purifying intrinsic factor which comprises dissolving impure intrinsic factor in a buffer solution having a pH of about 6 and a molarity of about 0.015, contacting the solution with diethylaminoethyl cellulose to adsorb the intrinsic factor thereon, filtering the diethylaminoethyl cellulose adsorbent from the aqueous solution, eluting the diethylaminoethyl cellulose with a buffer solution having a pH of about 7.6 and a molarity of about 0.075; and recovering purified intrinsic factor as a residue from the eluate.

2. A process according to claim 1 in which the adsorption and elution steps are carried out at a temperature between about 0° C. and about 37° C.

3. A process according to claim 1 wherein the impure intrinsic factor is obtained from hog pyloric mucosa.

4. A process according to claim 1 wherein the impure intrinsic factor is adsorbed from a solution having a pH of 6.1 and a molarity of 0.015 and the buffer solution used to elute the cellulosic resin has a pH of 7.6 and a molarity of 0.075.

References Cited

UNITED STATES PATENTS 3,008,877   11/1961   Robbins _____ 424—96

STANLEY J. FRIEDMAN, Primary Examiner